March 11, 1930.  H. FORD  1,749,807

CRANK SHAFT

Filed April 22, 1926

INVENTOR.
Henry Ford.
BY
ATTORNEY.

Patented Mar. 11, 1930

1,749,807

UNITED STATES PATENT OFFICE

HENRY FORD, OF DEARBORN, MICHIGAN, ASSIGNOR TO FORD MOTOR COMPANY, OF DEARBORN, MICHIGAN, A CORPORATION OF DELAWARE

CRANK SHAFT

Application filed April 22, 1926. Serial No. 103,953.

The object of my invention is to make a crankshaft which may be inherently in dynamic and static balance, and which will be easy and relatively cheap to construct.

A further object of my invention is to make a crankshaft which may be readily forged in the ordinary manner, and then to attach thereto counterbalancing weights which will facilitate placing the crankshaft in static and dynamic balance.

A further object of my invention is to provide a crankshaft similar to those which have been used, and to add thereto counterbalancing weights, which are secured to the crankshaft in proper place by being shrunk thereon.

Figure 1:
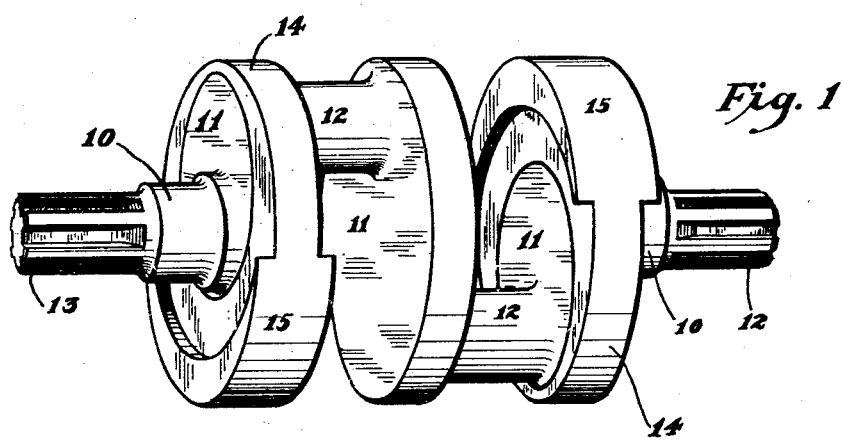
Figure 2:
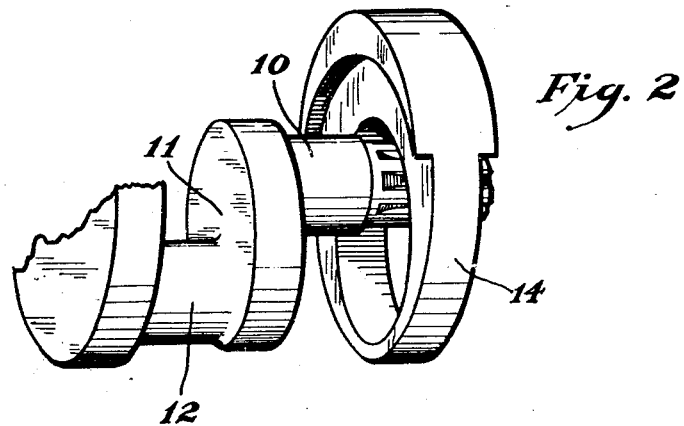

With these and other objects in view, my invention consists in the arrangement, combination, and construction of the various parts of my improved device as described in the specification, claimed in the claims, and illustrated in the accompanying drawing, in which:

Figure 1 shows a perspective view of a crankshaft embodying my invention, and Figure 2 shows a perspective view of a portion of a crankshaft having a counterbalance weight partially displaced to better illustrate the manner of installation.

Referring to the accompanying drawings, I have used the reference numerals 10, 11, 12 respectively to indicate the trunnions, the crank arms and the crank pins of the crankshaft proper of my improved device. This crankshaft proper is formed in the manner in which crankshafts are ordinarily formed, that is, by forging same from a bar of metal. The crankshaft proper has splines 13 at either end thereof for attaching the various fly wheels, pulley wheels and the like, used in connection with internal combustion engines.

Near the splined ends of the crankshaft proper, crank arms 11 are provided of substantially circular or disk shape. The periphery of these crank arms 11, are at least roughly machined and may be ground to the desired configuration, and rings 14 having eccentric openings therein of substantially the size of the crank arms 11 are provided, whereby when said rings 14 are heated and then forced over crank arms 11, then the cooling of the rings will shrink them on the crank arms 11, so they will to all intents and purposes, become an integral part of the crankshaft assembly.

It will be noted the central crank arm is of the same diameter as the end arms with the counterweight rings thereon, whereby the crankshaft assembly is given a shape which tends toward inherent balance.

These rings 14 are provided at one side of a diametric plane therethrough with enlarged counterweight portions 15, designed to counterbalance the weight of the crank pins 12, and to put the crankshaft assembly, due to their counterweight effect, in substantially dynamic balance.

In the form here shown these counterweights 15, are of substantially crescent shape, and of greater thickness than the rings 14, and crank arm 11. This specific shape, however, is not an essential feature of my invention, as the idea or purpose of these counterweight portions is to provide comparatively heavy weights as close to the crankshaft center as possible to offset the dynamic effect on the crankshaft assembly of the crank pins, which may be efficient for the purpose intended, and still keep the crankshaft outside diameter within relatively small limits. Of course these counterweight portions must be so shaped that they will not interfere with the operation of the connecting rods, which will of course be fastened to the crankshaft when it is in actual use. The shape of the opening in the rings 14, and of course the corresponding shape of the crank arms 11 also form no part of my invention, except in so far as the shape and size of these parts must be such as to permit the ring 14 to be shrunk solidly on to the crankshaft proper, so that it will not become accidentally displaced.

From the foregoing description of the construction of my improved crankshaft assembly, it will be seen that the forging of the crankshaft proper is a relatively simple forging job, and may be readily accomplished in the ordinary manner in ordinary forging machines. When this has been done the crank arms 11 may be properly machined and shaped, and then the trunnions 10 and the crank pins 12 may be shaped and ground to size in the manner in which crankshafts are ordinarily made. The rings 14 may be installed by being pressed on while hot and shrunk into place, and it will be noted that by this construction I am enabled to get free access to the crank pins 12 with an ordinary grinding wheel and machine tools for grinding and machining the crank pins 12 to shape and size prior to installing the counterweights. The counterweights 15 on the rings 14 however, are wide enough so that they overhang the crank pins 12 somewhat, so that a relatively large crank pin bearing area and a relatively small outside diameter crankshaft assembly is secured in connection with a crankshaft which is counter-weighted, to give a static and dynamic balanced crankshaft. Of course the counterweight 15 and if necessary the central crank arm 11, may be properly ground off or otherwise treated after the rings 14 have been shrunk on to the crankshaft proper to place the shaft in the static and dynamic balance.

These advantages may therefore be summed up by saying that I have been able to produce a crankshaft at a relatively small expense which is readily constructed and has a relatively small outside diameter in proportion to its crank pin bearing area.

Some changes may be made in the arrangement, dimensions, and construction of the various parts of my improved crankshaft assembly as herein described without departing from the spirit of my invention, and it is my intention to cover by my claims such changes as may reasonably be included within the scope thereof.

I claim as my invention:

1. In a crank shaft assembly, a pair of oppositely extending crank arms, a ring secured to each of said crank arms having the axes of their outer edges coinciding with the main axis of the crank shaft, and a weight secured to each side of each ring diametrically opposite to the crank arms, so that the crank shaft may be placed in static balance by machining material from the weights on one ring while rotating on the main crank shaft axis and then placed in dynamic balance by machining equal amounts of material from one of the weights on each ring while the crank shaft is rotating on its main axis.

2. In a two throw crank shaft assembly, a pair of disc shaped crank arms connecting the outer ends of the crank pins and the inner ends of the crank trunnions having their axes intermediate of the axes of their respective crank pins and trunnions, a ring shrunk on the periphery of each crank arm having the axis of its outer edge coinciding with the axis of the trunnion, and a weight formed integral with each side of each ring diametrically opposite the crank arm, so that the crankshaft may be placed in static balance by machining material from the weights on one ring while rotating on the trunnion axis and then placed in dynamic balance by machining equal amounts of material from one of the weights on each ring without at any time removing the shaft from static balance.

HENRY FORD.